(12) United States Patent
Chuang et al.

(10) Patent No.: US 6,890,008 B1
(45) Date of Patent: May 10, 2005

(54) INTERLOCKING DEVICE FOR AN ELECTRONIC APPARATUS

(75) Inventors: Wei-Ping Chuang, Taipei (TW); Wu-Yung Chen, Taipei (TW)

(73) Assignee: Compal Electronics Inc., Taipei (TW)

( * ) Notice: Subject to any disclaimer, the term of this patent is extended or adjusted under 35 U.S.C. 154(b) by 79 days.

(21) Appl. No.: 10/364,395

(22) Filed: Feb. 12, 2003

(30) Foreign Application Priority Data

Nov. 22, 2002 (TW) .............................. 91218915 U (51) Int. Cl.⁷ .......................................... E05C 19/10
(52) U.S. Cl. ................. 292/121; 292/45; 292/122; 292/124; 292/220; 292/DIG. 37
(58) Field of Search ...................... 292/121, 44, 45, 292/95, 122, 124, 128, 219, 220, DIG. 37, 292/DIG. 61

(56) References Cited

U.S. PATENT DOCUMENTS

| | | | | |
|---|---|---|---|---|
| 237,680 | A * | 2/1881 | Egbert ........................ | 292/121 |
| 274,497 | A * | 3/1883 | Judson ........................ | 292/121 |
| 294,778 | A * | 3/1884 | Ford et al. .................. | 292/128 |
| 413,245 | A * | 10/1889 | Richmond .................. | 292/175 |
| 767,567 | A * | 8/1904 | Keil ............................ | 292/127 |
| 824,027 | A * | 6/1906 | Keeler ........................ | 292/127 |
| 848,034 | A * | 3/1907 | Husemann .................. | 292/122 |
| 1,020,547 | A * | 3/1912 | Fuller .......................... | 292/121 |
| 2,047,401 | A * | 7/1936 | Whitted ...................... | 292/220 |
| 2,203,202 | A * | 6/1940 | Kun ............................. | 292/87 |
| 2,251,138 | A * | 7/1941 | Knight ........................ | 292/128 |
| 2,313,711 | A * | 3/1943 | Jacobi ......................... | 70/145 |
| 2,337,894 | A * | 12/1943 | Jacobi ......................... | 292/227 |
| 2,571,353 | A * | 10/1951 | Felsch ......................... | 292/128 |
| 2,656,206 | A * | 10/1953 | Piker ........................... | 292/86 |
| 3,100,980 | A * | 8/1963 | Humphries ................. | 70/71 |
| 4,007,828 | A * | 2/1977 | Mayled ....................... | 206/1.5 |
| 4,363,403 | A * | 12/1982 | Raucci et al. .............. | 206/387.13 |
| 4,365,711 | A * | 12/1982 | Long et al. ................. | 206/387.13 |
| 4,478,005 | A * | 10/1984 | Mundschenk .............. | 49/388 |
| 4,561,544 | A * | 12/1985 | Reeve ......................... | 205/540 |
| 4,630,852 | A * | 12/1986 | White et al. ................ | 292/87 |
| 4,730,731 | A * | 3/1988 | Allison ....................... | 206/540 |
| 4,774,973 | A * | 10/1988 | Gueret ........................ | 220/326 |
| 4,901,882 | A * | 2/1990 | Goncalves .................. | 220/324 |
| 4,904,007 | A * | 2/1990 | Woodruff .................... | 292/341.15 |
| 5,044,810 | A * | 9/1991 | Matsuoka et al. .......... | 403/93 |
| 5,106,132 | A * | 4/1992 | Bako et al. ................. | 292/128 |
| 5,198,966 | A * | 3/1993 | Kobayashi et al. ........ | 361/681 |
| 5,578,794 | A * | 11/1996 | Lamb et al. ................ | 174/52.1 |
| 5,603,540 | A * | 2/1997 | Shibao ........................ | 292/341.15 |
| 5,785,398 | A * | 7/1998 | Park ............................ | 312/223.2 |
| 5,967,570 | A * | 10/1999 | Lee ............................. | 292/31 |

(Continued)

*Primary Examiner*—Daniel P. Stodola
*Assistant Examiner*—Carlos Lugo
(74) *Attorney, Agent, or Firm*—Bacon & Thomas, PLLC (57) ABSTRACT

An interlocking device for locking a case includes first and second interlocking members. The first interlocking member is formed with a notch. The second interlocking member is formed with a button that is operable to rotate the second interlocking member from a first position, in which the first and second interlocking members engage each other and in which the button is received in the notch, to a second position, in which the first and second interlocking members disengage from each other and in which the button moves out of the notch.

3 Claims, 7 Drawing Sheets

U.S. PATENT DOCUMENTS

| | | | |
|---|---|---|---|
| 6,129,395 A * | 10/2000 | Schlesener et al. | 292/128 |
| 6,431,615 B1 * | 8/2002 | Bastian | 292/80 |
| 6,464,102 B1 * | 8/2002 | Harmon et al. | 220/835 |
| 6,540,268 B2 * | 4/2003 | Pauser | 292/48 |
| 6,659,514 B2 * | 12/2003 | Bass | 292/122 |
| 6,659,516 B2 * | 12/2003 | Wang et al. | 292/251.5 |

* cited by examiner

INTERLOCKING DEVICE FOR AN ELECTRONIC APPARATUS

BACKGROUND OF THE INVENTION

1. Field of the Invention

The invention relates to an interlocking device, more particularly to an interlocking device adapted to be mounted on an electronic apparatus.

2. Description of the Related Art

Figure 1:
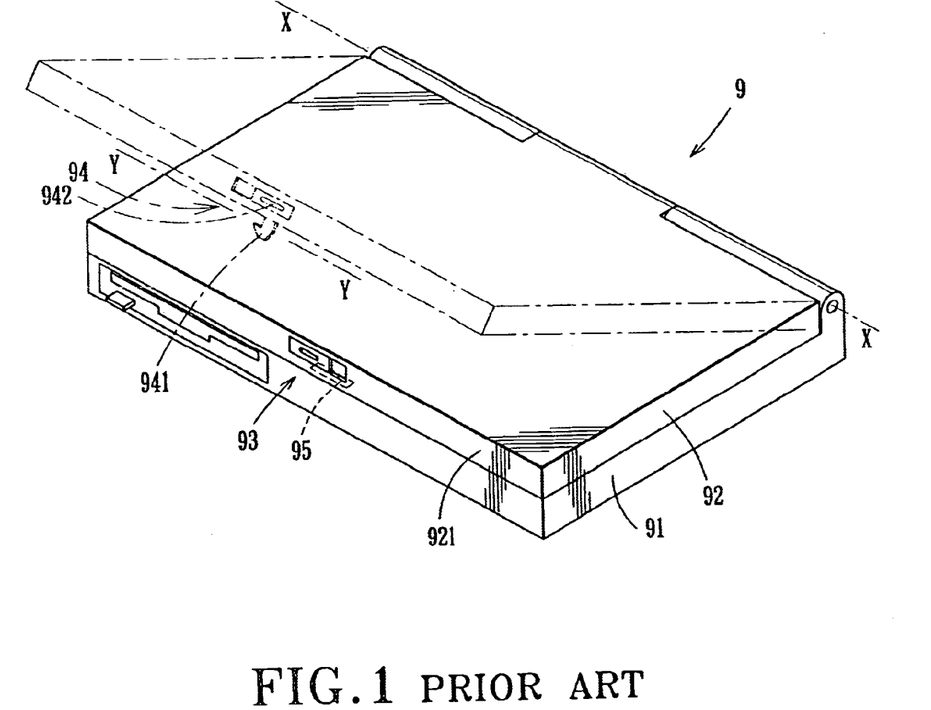
FIG. 1 is a perspective view of a case with a conventional interlocking device for locking the case.

As shown in FIG. 1, an electronic apparatus, such as a notebook computer, an electronic translation machine and a personal digital assistant, includes a case 9 that has a lower case portion 91 and an upper case portion 92 pivoted to the lower case portion 91, and an interlocking device 93 for interlocking the lower and upper case portions 91, 92. The upper case portion 92 is rotatable about an axis (X) relative to the lower case portion 91 between a position of use and a closed position. The interlocking device 93 includes a first interlocking member 94 mounted slidably on a front end 921 of the upper case portion 92, and a second interlocking member 95 mounted on a front end of the lower case portion 91. The first interlocking member 94 includes a spring-biased button 942 protruding outwardly from the front end 921 of the upper case portion 92, and a hook 941 extending downwardly from the button 942. The second interlocking member 95 is formed with a retaining groove formed in the front end of the lower case portion 91.

The first interlocking member 94 is slidable in a direction (Y) parallel to the axis (X) between a locked position and an unlocked position. When in the locked position, the hook 941 engages the retaining groove, thereby preventing rotation of the upper case portion 92 from the closed position to the position of use. When in the unlocked position, the hook 941 disengages from the retaining groove, thereby permitting rotation of the upper case portion 92 from the closed position to the position of use.

Since the button 942 is slid against an urging member (not shown) in the aforesaid direction (Y) to the unlocked position, the force exerted to offset the urging force of the urging member still has to be maintained before another direction of force is exerted to rotate the upper case portion 92 about the axis (X) to the position of use. That means, to complete the opening operation, the user needs to conduct the unlocking and opening operations with both hands. Moreover, with the rapid advancement in technology, the case 9 of the electronic apparatus is getting smaller and lighter. As such, when the user opens the upper case portion 92 with both hands without stabilizing the lower case portion 91 simultaneously, there is a chance that the lower case portion 91 will be undesirably moved upwardly together with the upper case portion 92.

SUMMARY OF THE INVENTION

Therefore, the main object of the present invention is to provide an interlocking device that can overcome the aforesaid drawbacks associated with the prior art.

Accordingly, the interlocking device for an electronic apparatus of this invention is adapted to be mounted on a case that includes a lower case portion and an upper case portion pivoted to and rotatable relative to the lower case portion about a first axis between opened and closed positions. The interlocking device comprises: a first interlocking member adapted to be mounted on a front end of the upper case portion, and having a bottom side formed with a notch; a second interlocking member adapted to be mounted pivotally on a front end of the lower case portion, and disposed rearwardly of the first interlocking member, the second interlocking member being rotatable about a second axis that is adapted to be parallel to the first axis, and being formed with a button that is operable to rotate the second interlocking member about the second axis from a first position, in which the button is received in the notch, and in which the first and second interlocking members engage each other, to a second position, in which the first and second interlocking members disengage from each other, and in which the button moves out of the notch, thereby permitting access into the notch; and a biasing member for urging the second interlocking member to move to the first position.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 2:
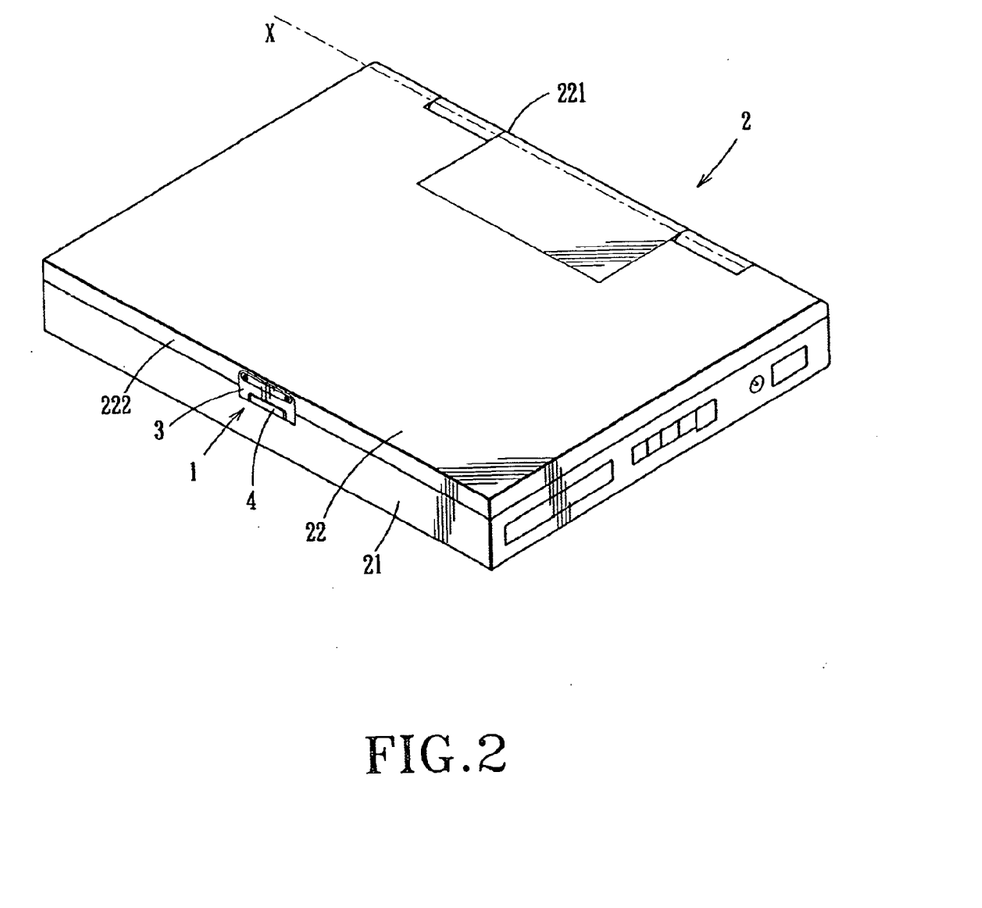
FIG. 2 is a perspective view of a preferred embodiment of an interlocking device according to the present invention for locking a case of an electronic apparatus.
Figure 3:
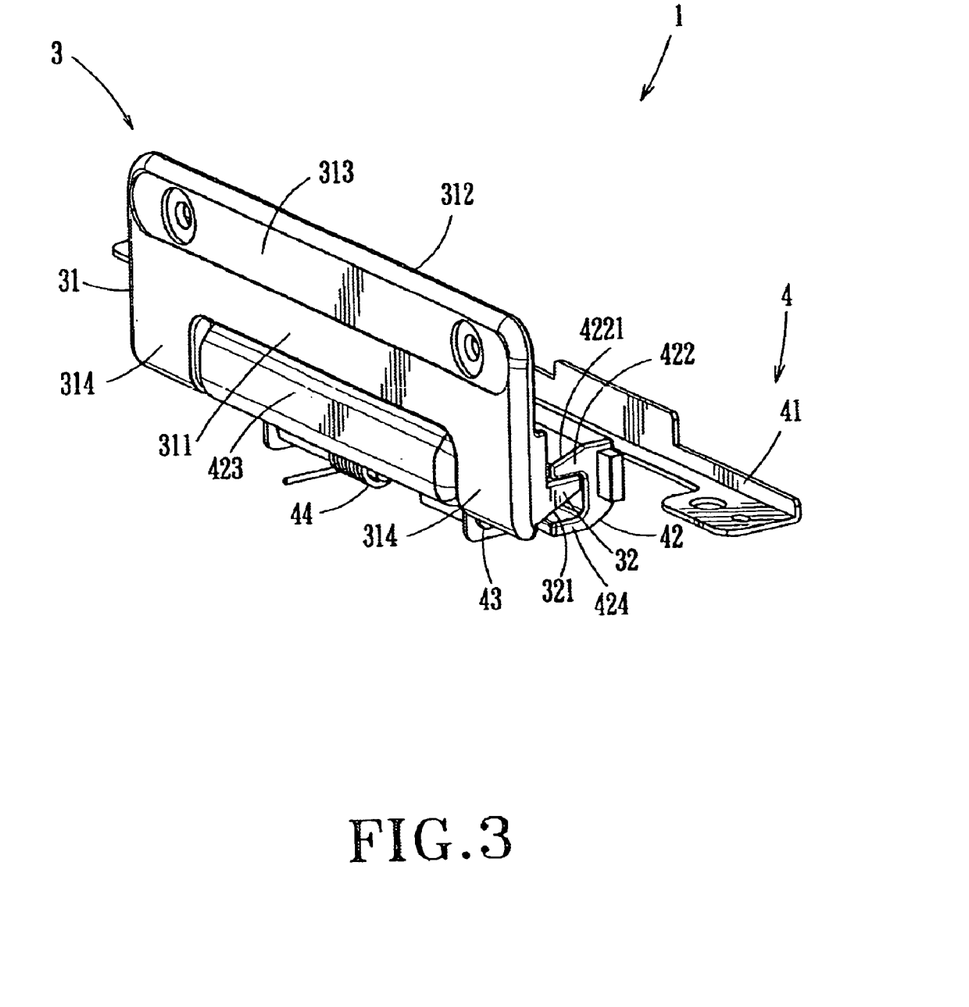
FIG. 3 is a perspective view of the preferred embodiment of the interlocking device in a first position.
Figure 4:
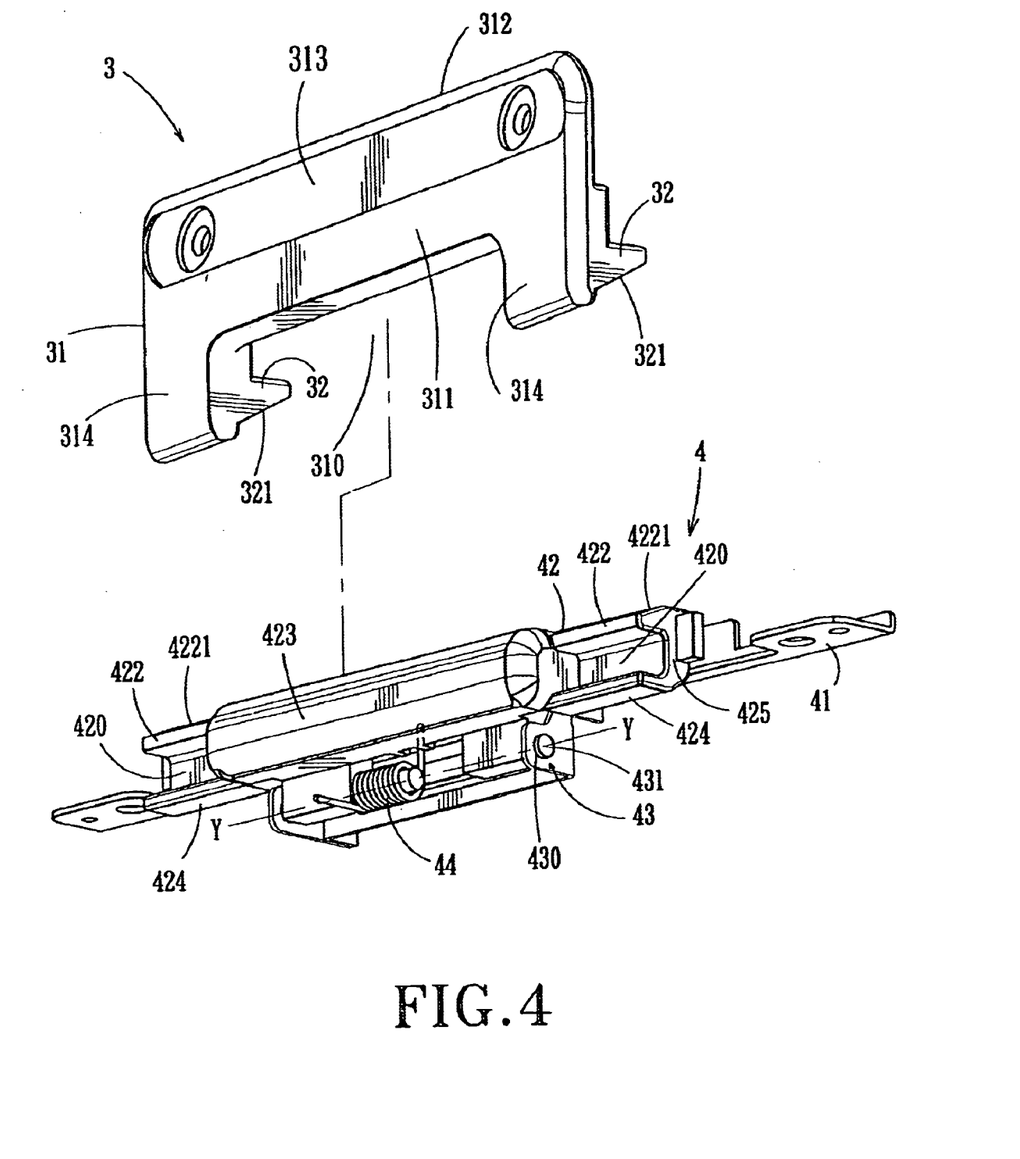
FIG. 4 is a perspective view of the preferred embodiment of the interlocking device in a second position.
Figure 5:
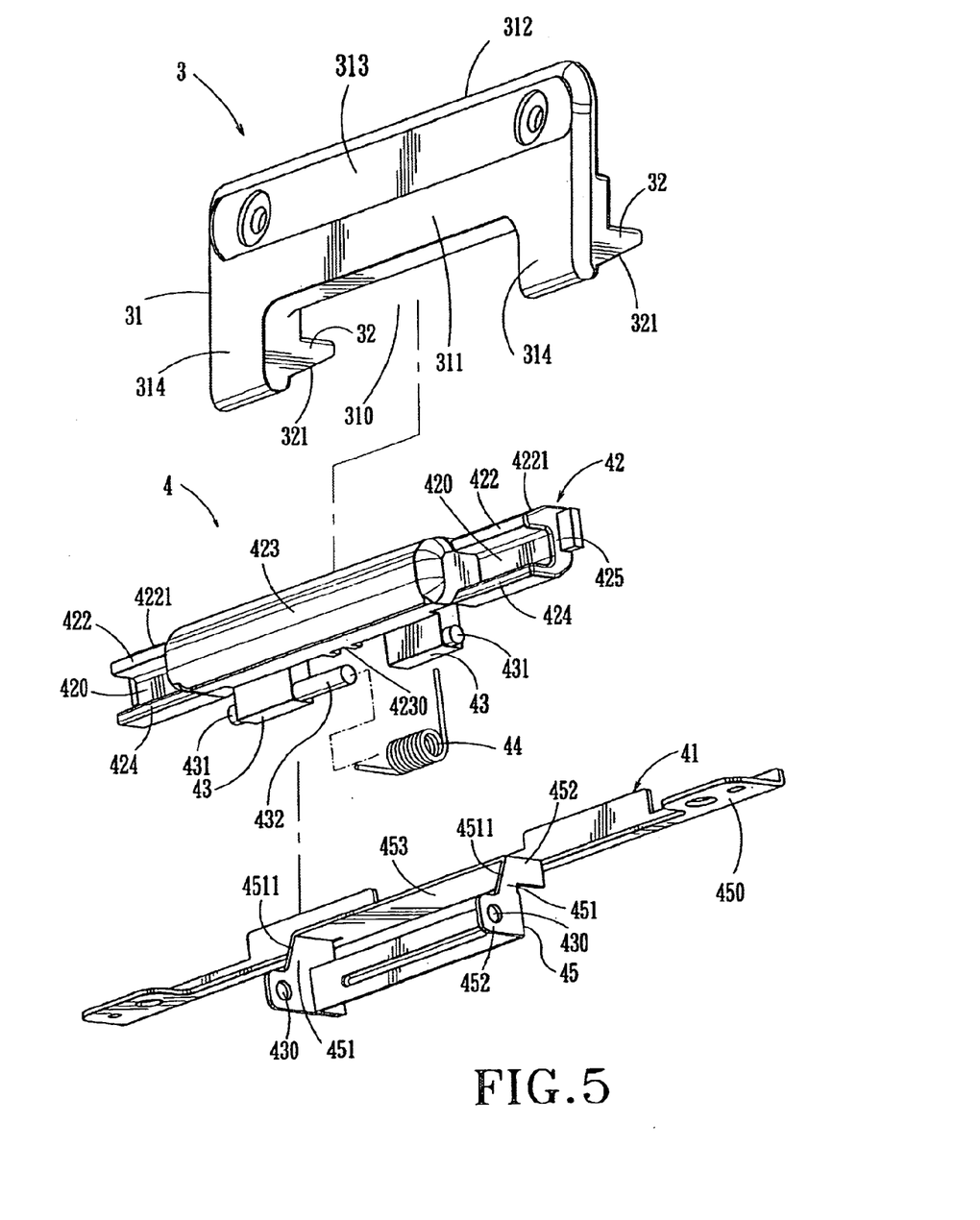
FIG. 5 is an exploded perspective view of the preferred embodiment of the interlocking device according to the present invention.

Referring to FIG. 2, the preferred embodiment of an interlocking device 1 according to the present invention is shown to be mounted on a notebook computer. The notebook computer includes a case 2 that has a lower case portion 21 and an upper case portion 22 pivoted to the lower case portion 21. The upper case portion 22 has a rear end 221 pivotally connected to the lower case portion 21. The upper case portion 22 is rotatable relative the lower case portion 21 about a first axis (X) between opened and closed positions. When the upper case portion 22 is in the opened position, the upper case portion 22 forms an angle relative to the lower case portion 21. When the upper case portion 22 is in the closed position, the upper case portion 22 abuts against the lower case portion 21.

As shown in FIGS. 2, 3, 4, 5 and 6, the interlocking device 1 includes a first interlocking member 3 mounted on a front end 222 of the upper case portion 22, a second interlocking member 4 mounted on a front end of the lower case portion 21, and a biasing member 44 mounted on the second interlocking member 4.

The first interlocking member 3 includes a mounting plate 31 and a pair of tongues 32. The mounting plate 31 has a rear face 312 connected to the front end 222 of the upper case portion 22, and an opposite front face 311. The mounting plate 31 includes a base part 313 adapted to be mounted on the upper case portion 22, and a pair of arms 314 extending downwardly from a bottom side of the base part 313 toward the lower case portion 21. A notch 310 is formed in the mounting plate 31, and is confined by the arms 314 and the base part 313. In this embodiment, the tongues 32 extend rearwardly and transversely from the arms 314, respectively, and away from the base part 313, and are respectively formed with inclined bottom faces 321 that incline upwardly and rearwardly from a bottom end of the mounting plate 31.

Figure 7:
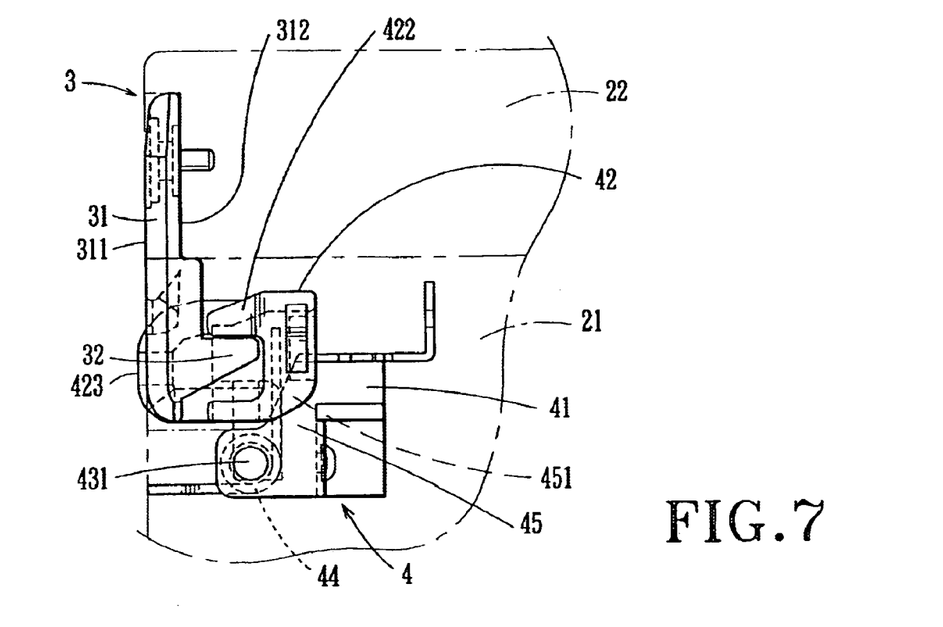
FIG. 7 is a side view of the preferred embodiment of the interlocking device in a first position.
Figure 8:
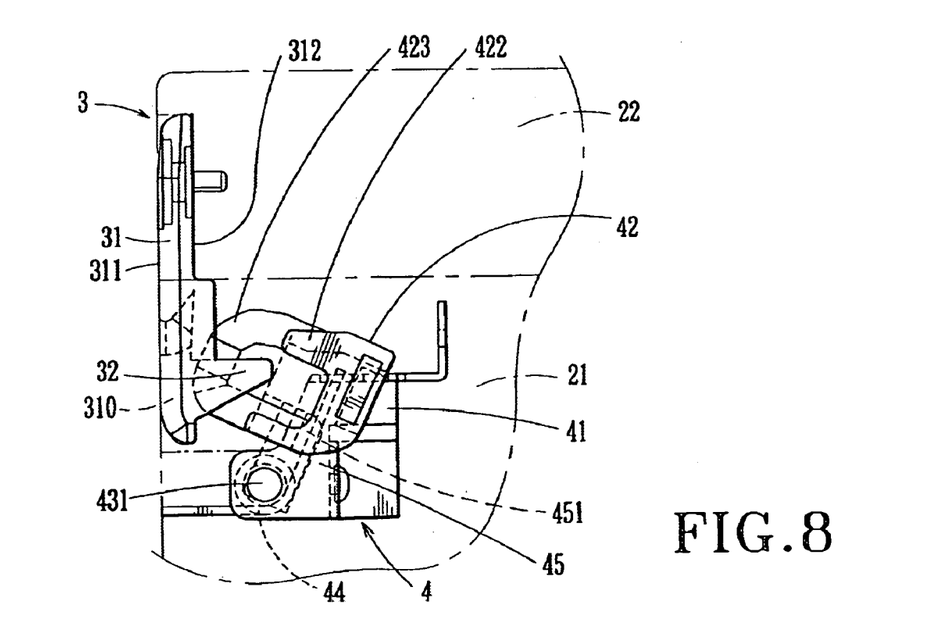
FIG. 8 is a side view of the preferred embodiment of the interlocking device in a second position.

The interlocking device 1 further includes a lock-mounting part 41 adapted to be securely attached to the front end of the lower case portion 21. The second interlocking member 4 includes a pivoting part 42 mounted pivotally on the lock-mounting part 41 so as to permit rotation of the pivoting part 42 about a second axis (Y) that is parallel to the first axis (X). The second interlocking member 4 is rotatable about the second axis (Y) relative to the first interlocking member 3 between engaging and disengaging positions (see FIGS. 7 and 8). A button 423 projects frontwardly from the pivoting part 42 into the notch 310 when the second interlocking member 4 is positioned at the engaging position.

The lock-mounting part 41 includes an elongated bracket 450 adapted to be mounted on the lower case portion 21, and a Z-shaped member 45 having a top plate 453 projecting frontwardly from the bracket 450, and a pair of spaced apart Z-shaped side plates extending downwardly and frontwardly from two opposite sides of the top plate 453. Each of the Z-shaped side plates includes upper and lower arms 452 and a middle portion 451 interconnecting the upper and lower arms 452. Each of the lower arms 452 of the Z-shaped side plates 45 is formed with a pivot hole 430. Each of the middle portions 451 of the Z-shaped side plates 45 has an inclined front face 4511.

The pivoting part 42 is formed with a pair of grooves 420 at two opposite sides of the button 423, and includes a pair of legs 43 projecting downwardly from a bottom thereof, and a pair of pivot studs 431 projecting respectively from the legs 43.

Figure 6:
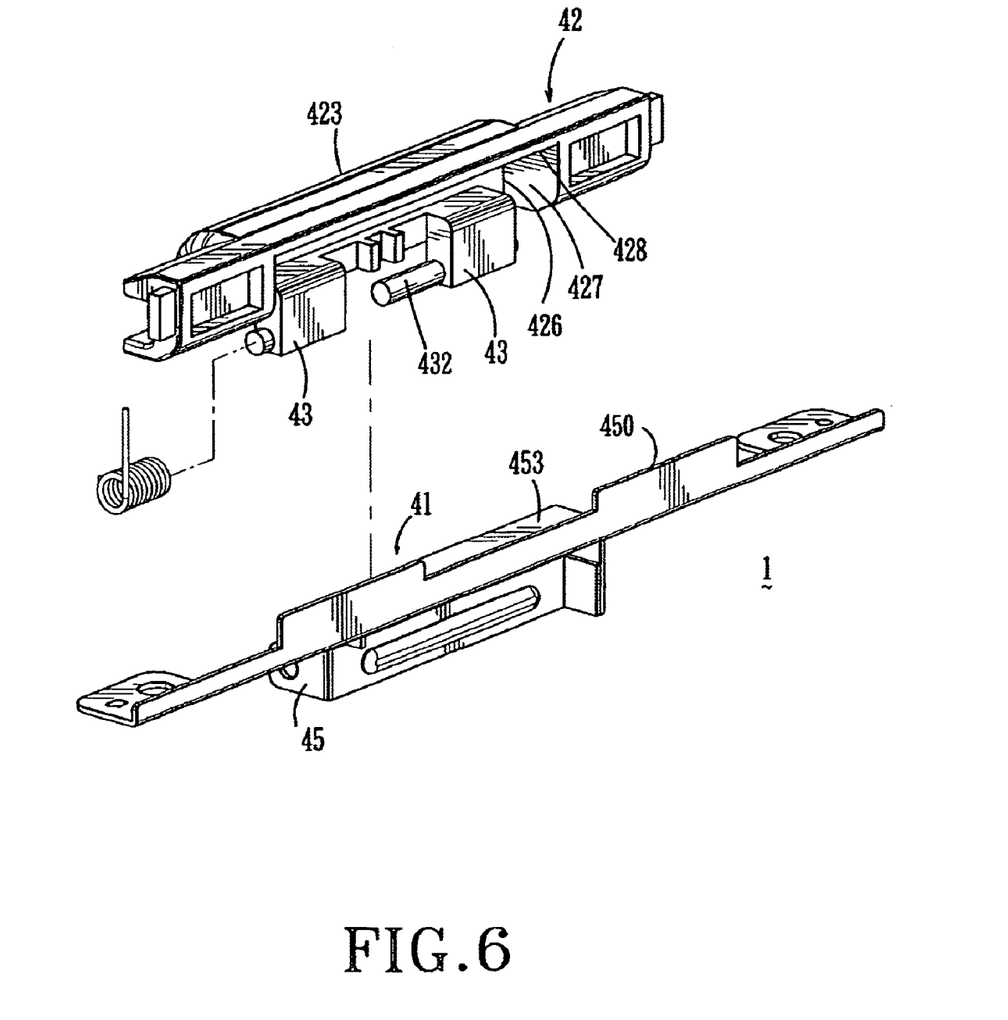
FIG. 6 is an exploded perspective rear view of the preferred embodiment of the second interlocking member of the interlocking device according to the present invention.

Referring to FIG. 6, the pivoting part is further formed with a rear recess 426 defined by a recess-defining wall 427 that has a top edge 428. The top plate 453 of the Z-shaped member 45 abuts against the top edge 428 of the recess-defining wall 427 when the second engaging member 4 is moved to the disengaging position, thereby preventing further rotation of the second engaging member 4. The top plate 453 of the Z-shaped member 45 is received in the rear recess 426 when the second interlocking member 4 is positioned at the engaging position. Each of the grooves 420 is defined by a groove-defining wall that has a base 425 and upper and lower arms 422, 424 extending transversely from the base 425. The upper arm 422 has an inclined top face 4221 extending downwardly and frontwardly from the base 425. Each of the inclined bottom faces 321 of the tongues 32 of the first interlocking member 3 pushes and slides along the inclined top face 4221 of the upper arm 422 during rotation of the upper case portion 22 to the closed position so as to permit receiving of the tongues 32 into the grooves 420. In the engaging position, the button 423 is received in the notch 310 and the tongues 32 engage respectively the grooves 420. In the disengaging position, the button 423 is moved out of the notch 310, and the tongues 32 disengage from the grooves 420. A positioning hole 4230 is formed in the bottom of the pivoting part 42, and is disposed below the lower arm 424.

The legs 43 extend downwardly from the bottom of the pivoting part 42 at two opposite sides of the positioning hole 4230. The pivot studs 431 project from lower ends of the legs 43 and into the pivot holes 430, respectively, and cooperatively define the second axis (Y).

The biasing member 44 includes a coil spring that is sleeved around a pin 432 which is formed on one of the legs 43. The coil spring has one end adapted to be secured to the lower case portion 21, and the other end passing through the positioning hole 4230 and abutting against an inner wall that defines the positioning hole 4230.

In operation, the case 2 can be easily opened by pushing the button 423 to move rearwardly and outwardly of the notch 310, which results in disengagement between the tongues 32 and the grooves 420, and which permits the user to access into the notch 310 to lift the upper case portion 22.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. An interlocking device for an electronic apparatus having a case that includes a lower case portion and an upper case portion pivoted to and rotatable about the lower case portion about a first axis between opened and closed positions, said interlocking device comprising:

a first interlocking member adapted to be mounted on a front end of the upper case portion, and having a bottom side formed with a notch;

a second interlocking member adapted to be mounted pivotally on a front end of the lower case portion, and disposed rearwardly of said first interlocking member, said second interlocking member being rotatable about a second axis that is adapted to be parallel to the first axis, and being formed with a button that is operable to rotate said second interlocking member about said second axis from a first position, in which said button is received in said notch, and in which said first and second interlocking members engage each other, to a second position, in which said first and second interlocking members disengage from each other, and in which said button moves out of said notch, thereby permitting access into said notch;

a biasing member for urging said second interlocking member to move to said first position; and a lock-mounting part adapted to be securely attached to the front end of the lower case portion, said first interlocking member including a mounting plate adapted to be attached securely to the front end of the upper case portion and having a bottom side formed with said notch, and a pair of tongues extending rearwardly and transversely from said mounting plate, and disposed adjacent to two opposite side of said notch, said second interlocking member including an elongated pivoting part that is pivoted to said lock-mounting part and that is formed with a pair of grooves at two opposite sides of said button, said grooves receiving and engaging respectively said tongues when said second interlocking member is positioned at said first position, wherein each of said tongues has a bottom face inclined upwardly and rearwardly from a bottom end of said mounting plate, said pivoting part being formed with a rear recess defined by a recess-defining wall that has a top edge, said lock-mounting part including a bracket adapted to be secured to the lower case portion and a z-shaped member projecting frontwardly from said bracket, each of said grooves being defined by a groove-defining wall that includes a base and upper and lower arms extending transversely and frontwardly from said base, said upper arm having an inclined top face extending downwardly and frontwardly from said base, each of said inclined bottom faces of said tongues of said first interlocking member pushing and sliding along said inclined top face of said upper arm of said U-shaped plate of said pivoting part of said second interlocking member during rotation of said upper case portion to said closed position so as to permit receiving of said tongues into said grooves.

2. The interlocking device as claimed in claim 1, wherein said pivoting part further includes a pair of legs extending downwardly from a bottom thereof, and a pair of pivot studs extending transversely and respectively from said legs, said Z-shaped member including a pair of Z-shaped side plates, each of which including a middle portion and upper and lower arms, and a top plate that interconnects said Z-shaped side plates, said top plate projecting into said rear recess and abutting against said top edge of said recess-defining wall when said second interlocking member is positioned at said engaging position, each of said lower arms of said Z-shaped side plates being formed with a pivot hole for extension of a respective one of said pivot studs therethrough.

3. The interlocking device as claimed in claim 2, wherein said second interlocking member further includes a pin formed on one of said legs, said bottom of said pivoting part being formed with a positioning hole, said biasing member being sleeved around said pin and having one end adapted to be secured to the lower case portion, and the other end passing through said positioning hole and abutting against an inner wall that defines said positioning hole.

* * * * *